United States Patent [19]

Layman

[11] 4,249,367
[45] Feb. 10, 1981

[54] BRUSH WINDROWER

[76] Inventor: Mike D. Layman, 1318 Towline Rd., Benton Harbor, Mich. 49022

[21] Appl. No.: 74,398

[22] Filed: Sep. 10, 1979

[51] Int. Cl.³ .............................................. A01D 7/02
[52] U.S. Cl. ....................................... 56/365; 56/375
[58] Field of Search ................. 56/365, 366, 375, 376, 56/395

[56] References Cited

U.S. PATENT DOCUMENTS

| 2,531,557 | 11/1950 | Dayton | 56/255 |
| 2,756,557 | 7/1956 | Bornzin et al. | 56/376 |
| 4,166,352 | 9/1979 | Knusting | 56/366 |

FOREIGN PATENT DOCUMENTS 229624  10/1963  Austria ........................................ 56/376

*Primary Examiner*—Paul J. Hirsch
*Attorney, Agent, or Firm*—Marmaduke A. Hobbs

[57] ABSTRACT

A brush windrower for accumulating brush and trimmings from under orchard trees, in which a main frame extends rearwardly from a tractor which is driven between the tree rows, and a rake bar extends outwardly from the main frame and passes underneath the overhanging branches to gather the brush. The rake bar is pivotally attached to the main frame and a hydraulic cylinder swings the rake bar around the pivot point to move the accumulated brush into the drive middles of the orchard. The rake bar is hinged to permit the rake teeth to tilt, thereby fully releasing the brush. Depth of extension of the rake bar is regulated hydraulically or by adding extensions to the rake bar. The rake bar also can be tilted to sweep evenly across sloping ground.

16 Claims, 11 Drawing Figures

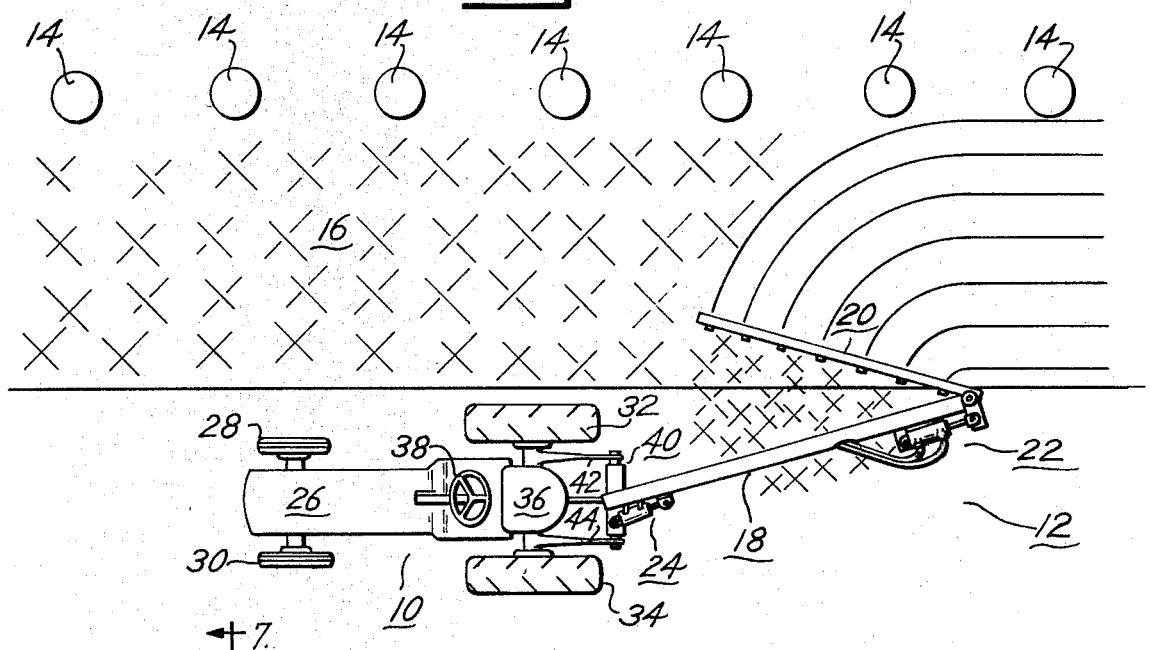
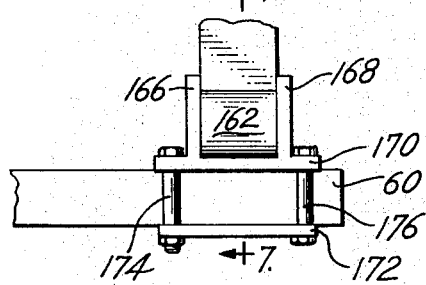
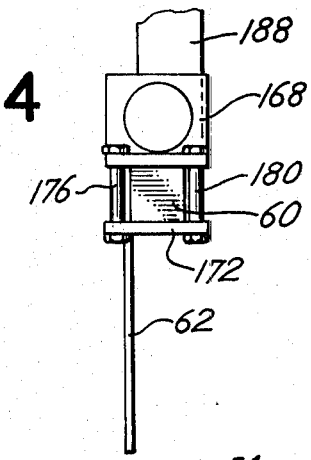
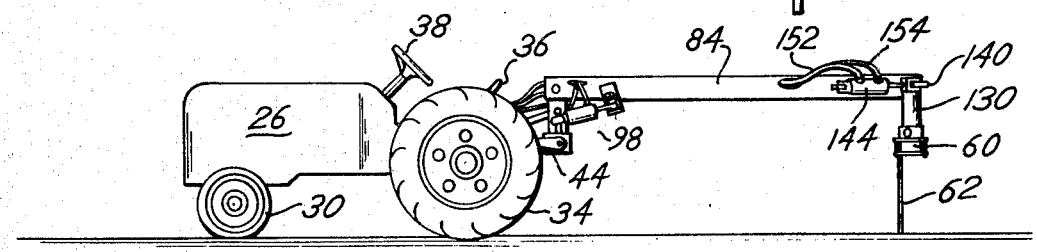
Fig. 1
Fig. 3
Fig. 4
Fig. 2

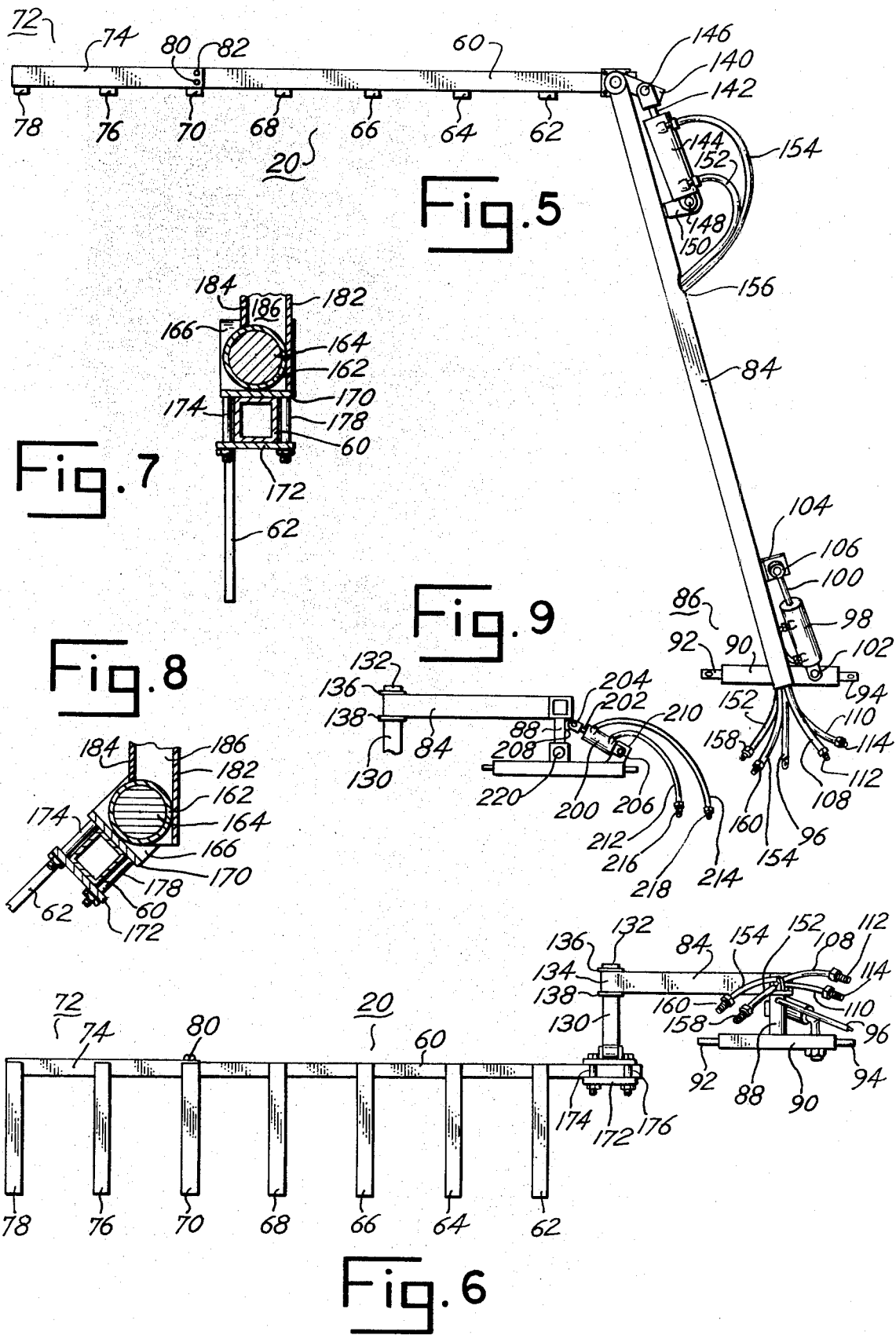

BRUSH WINDROWER

Fruit trees, nut trees and the like are typically grown in rows or hedges spaced far enough apart for tractors and other farm equipment to pass between them when harvesting, spraying, or otherwise servicing the trees. Within each row, however, the trees are usually quite close together, with branches between the trees nearly touching. To promote desirable growth and maximum production from the trees, nonproductive limbs or branches are removed periodically, and the healthy branches are trimmed to achieve the desired shaping of the trees. The cut branches or limbs fall to the ground and accumulate around the tree. No suitable device has existed to gather up the limbs quickly, and this operation has been done with gathering devices mounted on the front of tractors which are repeatedly driven toward and backed away from the trees much like a front end loader, or the gathering has been done by hand. When done by hand, workers go to each tree and gather up the brush with rakes or forks, placing the brush in trucks or wagons driven down the drive middles between the tree rows. Especially in a large orchard or nut farm, either previous gathering method is costly and time consuming. Since the trimming is done only periodically, the typical grower does not normally have enough permanent labor available to gather up the trimmings and must hire outside labor to assist in the operation. Difficulties are often encountered in securing a sufficient number of workers at the exact time that the labor is required. Since all growers of the same type of trees will usually trim their trees at approximately the same time in the production year, there is great demand and competition for the workers who are available, and the demand frequently exceeds the available work force. If the trimmings are not picked up within a reasonable length of time after they are cut, they can become matted down under the trees, making pick-up even more difficult, or strong winds can blow the limbs around the orchard if they are left out for a long period of time. Gathering the brush by hand is not only difficult and slow, but can also be somewhat hazardous to the workers who must work among the trimmings and under the low limbs of the trees.

It is therefore a principal object of the present invention to provide a brush windrower which can be attached to and operated by a tractor driven down the drive middles between the rows of trees, and which will gather the brush and trimmings into large piles in the drive middles between the rows from where it can quickly be picked up and removed by hand or by a tractor with front end loader, thus substantially reducing the need to hire extra labor, as well as minimizing the costs and the time required to clean an orchard after trimming.

Another object of the present invention is to provide a brush windrower which is adjustable in length so that it can be made to extend from the drive middle to the center of the tree row for various size trees, and has extensions that can be added to provide even further reach under trees, and which can be narrowed sufficiently for easy and safe transport on roads or highways.

Yet another object of the present invention is to provide a brush windrower which will thoroughly gather up the accumulated brush from underneath a pruned tree in an orchard, and which can be operated to sweep the brush into various positions in the drive middle or to leave the brush in accumulated piles underneath or between trees in the same row.

A further object of the present invention is to provide a brush windrower for use in orchards which can be lifted to permit complete release of the brush which it has gathered, and which will enable the pickup of brush to be done more quickly, before the brush has become matted under the trees or blown throughout the orchard.

Still another object of the present invention is to provide a brush windrower which will remove the brush from underneath trees into open areas, thereby reducing the risk of injury to workers who would otherwise have to work underneath the low trees and in the brush on the ground.

Further objects and advantages of the present invention will become apparent from the following description and accompanying drawings, wherein:

FIG. 1 is a top plan view of a brush windrower embodying the present invention, showing it being towed by a farm tractor through an orchard tree row to gather brush and trimmings;

FIG. 2 is a side elevational view of the tractor and brush windrower shown in FIG. 1;

FIG. 3 is a front elevational view of the pivot mechanism by which the rake bar of the present invention is attached to the draw pole;

FIG. 4 is a side elevational view of the mechanism shown in FIG. 3;

FIG. 5 is a top plan view of the brush windrower of the present invention, showing it in its extended position;

FIG. 6 is a front elevational view of the brush windrower, showing it in the same position as seen in FIG. 5;

FIG. 7 is a cross sectional view of the pivot mechanism shown in FIG. 3, the section being taken on line 7—7 of the latter figure;

FIG. 8 is a cross sectional view similar to that of FIG. 7 but showing the rake bar in a pivoted or brush releasing position;

FIG. 9 is a fragmentary front elevational view of a modified form of the present invention;

Figure 10:
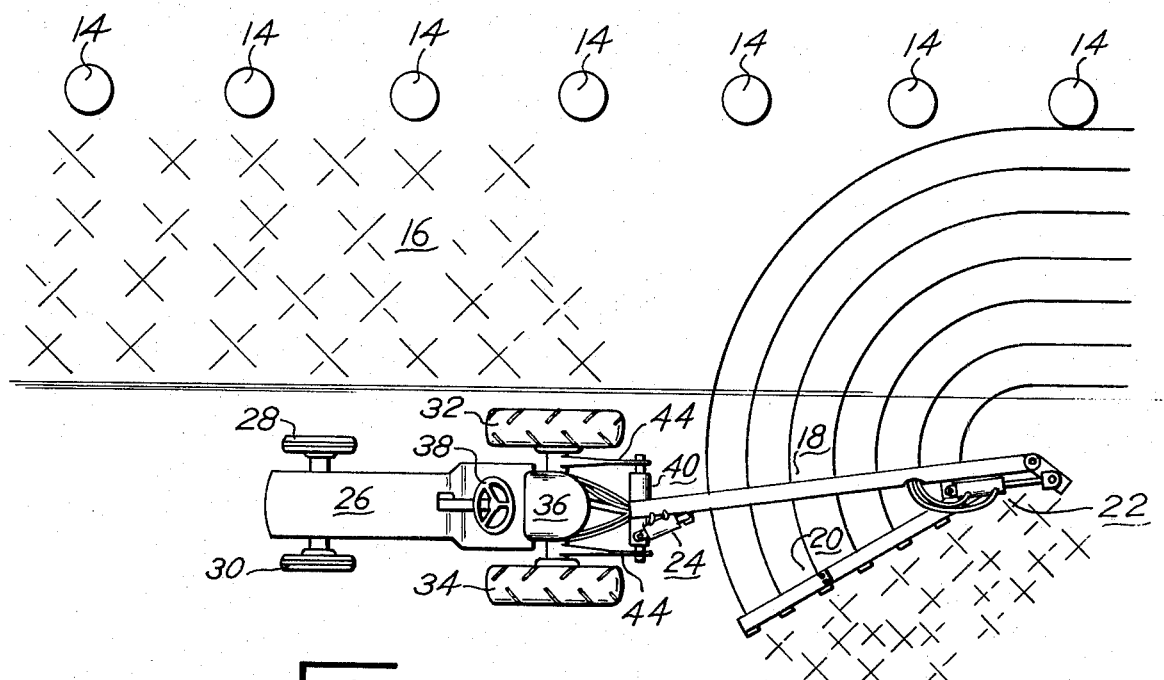
FIG. 10 is a top plan view of the brush windrower and tractor shown in FIG. 1, but having the rake arm in the discharge or brush releasing position.

Referring more specifically to the drawings and to FIG. 1 in particular, numeral 10 designates a farm tractor having a brush windrower 12 of the present invention attached thereto. Tractor 10 is pulling brush windrower 12 through a row of orchard trees, the trunks of which are represented by the circles 14. The brush and trimmings which windrower 12 is gathering are shown as cross marked areas designated by numeral 16 in the drawings. Typically, the branches from trees 14 will overhang the area 16 in which the brush lies, which makes gathering difficult, and it is for this reason that the brush windrower of the present invention greatly facilitates the gathering of brush.

Windrower 12 consists generally of a draw pole assembly 18 and a rake bar asembly 20 pivotally attached to draw pole 18, its position in respect to draw pole 18 being regulated by a hydraulic mechanism 22. In its operating position, rake bar 20 extends outwardly from draw pole 18 at substantially right angles and can gather the brush from underneath the overhanging branches of the trees 14. The distance of which rake bar 20 extends away from tractor 10 may be controlled by a second hydraulic mechanism 24 which regulates the positioning of draw pole 18. Tractor 10 is a conventional farm tractor having an outer body or housing 26, front wheels 28 and 30 and rear wheels 32 and 34. A seat 36 is provided on which the tractor operator sits when driving tractor 10, and a steering wheel 38 controls the front wheels 28 and 30. Brush windrower 12 may be connected to any farm type tractor having a standard three point hitch mechanism 40 having lift arms 42 and 44. A tractor to be used with the present invention must also have a conventional farm implement hydraulic system capable of operating two hydraulic cylinders.

Rake bar 20 of brush windrower 12 has a horizontal member 60 of heavy steel tubing or the like with downwardly extending rake teeth 62, 64, 66, 68 and 70 attached thereto. The rake teeth, which are preferably spring steel, may be welded, bolted or otherwise attached to member 60 and should be constructed of steel bars heavy enough to push and gather large limbs and branches when the teeth are drawn under the orchard trees. An extension 72 consisting of a horizontal member 74 and rake teeth 76 and 78 may be attached to rake bar 20 by bolts 80 and 82 to extend the length of rake bar 20 to reach under trees having overhanging limbs which extend substantial distances from the tree trunk.

Draw pole assembly 18 has a main frame member 84 of hollow metal tubing being connected at its front end to the implement portion of the three point hitch mechanism 86, and being pivotally attached at its rear portion to rake bar 20. Hitch mechanism 86 consists of a vertical member 88 and a horizontal member 90 having side pins 92 and 94 extending outwardly therefrom for connection to lift arms 42 and 44 of tractor hitch mechanism 40, the pins being secured therein by bolts or clips, not shown. The three point hitch mechanism and method of attachment are conventional and found on many farm tractors and implements, and any of the well known designs may be used. A top link member 96 extends from vertical member 88 and is attached to tractor 10, thus providing a pivot point so that raising or lowering lift arms 42 and 44 will raise and lower the entire brush windrower 12. The attachment of vertical member 88 to frame member 84 is a pivotal type so that frame member 84 may pivot horizontally with respect to vertical member 88. A hydraulic cylinder 98 having a rod 100 is attached to horizontal member 90 by a pin 102 and to plate 104 extending from frame member 84 by a pin 106. Hydraulic lines 108 and 110 having hydraulic couplings 112 and 114, respectively, connect cylinder 98 to the hydraulic system of tractor 10. Upon activation of hydraulic cylinder 98, rod 100 moves frame member 84 angularly with respect to vertical member 88 due to the pivotal mounting between frame member 84 and vertical member 88; thus, the depth of extension of rake bar 20 away from the tractor 10 into the row may be adjusted to meet the conditions encountered in the row.

At the rear of frame member 84, a vertical member 130 is pivotally attached to member 84, the pivotal attachment consisting essentially of a shaft member 132 extending through a cylinder like portion 134 at the end of frame member 84, and collars 136 and 138 securing the shaft member 132 in cylindrical portion 134. A plate 140 extends radially outwardly from shaft 132, and a rod 142 of a hydraulic cylinder 144 is secured to plate 140 by a pin 146. Hydraulic cylinder 144 is secured by a pin 148 to a plate 150 extending outwardly from frame member 84. Hydraulic lines 152 and 154 from hydraulic cylinder 144 are passed through an opening 156 in frame member 84 and extend within the member to the front of brush windrower 12. Hydraulic couplings 158 and 160 at the ends of hydraulic lines 152 and 154 are used to connect cylinder 144 to the hydraulic system of tractor 10. Thus it can be seen that by pressurizing cylinder 144, rod 142 will extend outwardly, thereby moving plate 140 rearwardly and rotating vertical member 130 within cylindrical portion 134. Since rake bar 20 is attached to vertical member 130 in a manner to be described subsequently, the bar is pivoted toward frame member 84 as rod 142 continues to move outwardly from cylinder 144.

At the lower end of vertical member 130 a cylindrical portion 162 is disposed for the pivotal mounting of rake bar 20 thereon. A shaft 164 is rotatably mounted in cylindrical portion 162 and is secured in vertical portions 166 and 168 of plate 170. In the attachment of rake bar 20, plate 170 is disposed on the top of member 60 and a lower plate 172 is disposed on the bottom thereof. Bolts 174, 176, 178 and 180 extend through plates 170 and 172 and, when tightened sufficiently, secure member 60 therebetween. This particular type of connection between rake bar 20 and vertical member 130 provides several distinct advantages. The clamp type connection of member 60 between plates 170 and 172 permits a certain amount of depth adjustment of rake bar 20 by varying the position of member 60 between plates 170 and 172 before it is secured therebetween. The pivotal mounting of shaft 164 in cylindrical portion 162 allows the rake bar to pivot from the vertical position utilized during the gathering phase of operation. The mounting of cylindrical portion 162 on vertical member 130 and the orientation of plate 170 in respect thereto permits the bottom of the rake teeth to tilt forward but not backward. This is best shown in FIGS. 7 and 8 which reveal that cylindrical portion 162 is not centrally mounted in vertical member 130 but is disposed forwardly from the rear wall panel 182 of member 130. Front wall panel 184 of member 130 terminates at the outer surface of cylindrical portion 162, and rear wall panel 182 extends to the bottom edge of cylindrical portion 162. Side walls 186 and 188 of member 130 have circular openings therein which permit shaft 164 to pass therethrough. Thus, as force is exerted on the front of the rake teeth extending downwardly from member 60, shaft member 164 will pivot within cylindrical portion 162 and the rake bar 20 will move rearwardly to the point where rear wall 182 and plate 170 are lodged against each other as shown in FIG. 7. Continued exertion of pressure on the front of the rake teeth will hold the rake teeth vertically as tractor 10 moves forward. However, pressure applied on the rear side of the rake teeth will cause rake bar 20 to pivot forwardly as shown in FIG. 8. This is especially advantageous when brush windrower 12 is being backed away from a pile of brush, thereby causing the teeth to tip forward and providing a complete release of the brush from the rake teeth.

A modified form of the brush windrower is shown in FIG. 9 wherein a hydraulic cylinder 200 having a rod 202 is disposed between vertical member 88 and horizontal member 90. Pins 204 and 206 are used to secure cylinder 200 between plates 208 and 210 extending outwardly from members 88 and 90, respectively. Hydraulic lines 212 and 214, having hydraulic couplings 216 and 218, operatively connect hydraulic cylinder 200 to the hydraulic system of the towing tractor. In this modified embodiment, a pivotal connection between vertical member 88 and horizontal member 90, similar to that between rake bar 20 and vertical member 130 previously described, is utilized. A shaft 220 is disposed through a cylindrical portion connected to member 88 which is similar to portion 162; however, in this particular embodiment the cylindrical portion is centrally mounted on vertical member 88 so that member 88 may pivot equally in both directions with respect to horizontal member 90. Cylinder 200 causes the pivoting movement and holds the vertical member in the desired position. As vertical member 88 is moved around the horizontal axis formed by shaft 220, rake bar 20 will move angularly away from its normal horizontal position. This permits utilization of the brush windrower, with this modified feature, in orchards having contoured terracing of the ground around the fruit or nut trees. It also enables better utilization of the windrower on hillside locations where the tractor pulling the brush windrower will be in either a much higher or lower position than the ground under the outermost end of rake bar 20. The rake bar may be positioned angularly with respect to the horizontal position to provide a parallel sweep across the ground surface in these uneven areas. The remainder of the brush windrower incorporating this modified feature is essentially identical to that previously described.

Figure 11:
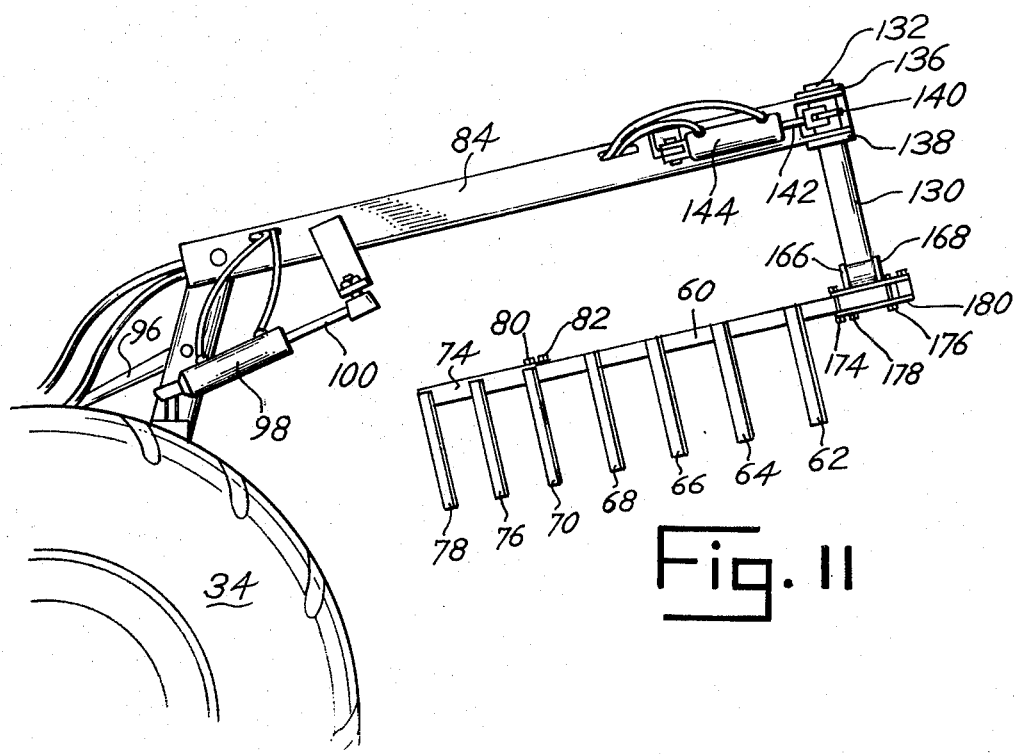
FIG. 11 is a perspective view of the brush windrower of the present invention in its elevated or transport position.

In the use and operation of the brush windrower embodying the present invention, windrower 12 is connected to tractor 10 by securing pins 92 and 94 in lift arms 42 and 44 of the three point hitch mechanism. Top link 96 is secured to tractor 10 so that as lift arms 42 and 44 are elevated, top link 96 provides a fixed distance between tractor 10 and brush windrower 12 and the entire brush windrower 12 will be raised. Hydraulic couplings 112 and 114 of cylinder 98 and couplings 158 and 160 of cylinder 144 are connected to the hydraulic system of tractor 10. For transport of brush windrower 12 to the orchard in which it is to be used, cylinder 144 is activated to extend rod 142, thereby swinging rake bar 20 to a position nearly parallel with frame member 84. Cylinder 98 is activated to retract rod 100, thereby drawing frame member 84 to a position directly behind tractor 10. Lift arms 42 and 44 are elevated to raise brush windrower 12 above the ground as shown in FIG. 11. Thus, a closed arrangement extending directly behind tractor 10 is provided and movement through gates, on highways and on narrow roads is possible, in that no portion of the windrower extends a significant distance past the side of tractor 10. When the tree row to be cleared of brush is approached, lift arms 42 and 44 are lowered and rod 142 of cylinder 144 is retracted so that the windrower is in the lowered and extended position wherein the rake teeth are in contact with the ground or just slightly thereabove and the rake bar is generally perpendicular to the tractor. Tractor 10 is then driven down the drive middles between the various tree rows with rake bar 20 extending outwardly therefrom underneath the overhanging branches of the trees. Depending upon the size of the trees and the distance of overhang from the tree trunks, extension 72 may be required to lengthen the rake bar. The positioning of member 60 between plates 170 and 172 may also be adjusted to achieve greater or lesser extension of the rake bar. Also, hydraulic cylinder 98 can be operated to change the angularity of frame member 84 with respect to horizontal member 90, thereby increasing or decreasing the extension of rake bar 20 away from tractor 10.

When proper extension has been achieved, tractor 10 is driven along the tree row and rake bar 20 is towed underneath the overhanging branches. The teeth of rake bar 20 accumulate the brush and trimmings lying on the ground, pushing them forward as tractor 10 moves forward. When sufficient brush and trimmings have been accumulated in front of rake bar 20, the tractor is stopped and hydraulic cylinder 144 is activated to extend rod 142, thus pushing plate 140 rearwardly, and swinging rake bar 20 inwardly toward frame member 84. Retraction of rod 100 of cylinder 98 will permit further movement of rake bar 20 toward the drive middle in the orchard. Hence, as shown in FIG. 10, the pile of accumulated trimmings and brush can be moved fully into the drive middle between the trees, where it can be easily and quickly loaded by hand or by a tractor having a front end loader thereon. As hydraulic cylinders 98 and 144 are activated to move rake bar 20 back to its gathering position, the rake teeth of rake bar 20 tip forward as rake bar 20 is drawn backward, due to the pivotal mounting of rake bar 20 to vertical member 130. Thus, as shown in FIG. 8, the angularity of the rake teeth, such as rake tooth 62 shown in that figure, will permit the rake teeth to slide easily out of the pile of accumulated brush. Once rake bar 20 has been repositioned in its operating or gathering position as shown in FIG. 5, the tractor operator may then proceed forward with movement of tractor 10 to accumulate brush farther down the tree row. Slight forward movement will move the rake teeth back to a vertical position to gather more brush. It if is not desired to move the brush piles into the drive middles between the trees, and it is instead desired to leave the brush piles between the trees in the tree row, when large pile has been accumulated by the brush windrower, lift arms 42 and 44 are activated to raise the windrower above the pile of brush. The tractor is then moved slightly forward and the windrower lowered so that the rake teeth are in front of the accumulated pile and the operation can proceed forward down the tree row to accumulate more piles of brush.

If the modification shown in FIG. 9 is used and the orchard is of uneven countour, as side slopes are reached, cylinder 200 is activated to move member 88 from the vertical position. Extension of rod 202 will tilt the outer end of rake bar 20 downwardly, thus bringing the rake teeth in contact with the ground if the tractor is on a slope higher than the outer edge of rake bar 20. Conversely, if rod 202 is retracted, the outer end of rake bar 20 will be raised with respect to the horizontal, and will thus provide an even sweep over a surface on a slope higher than that on which the tractor is being driven.

Many man hours of labor can be saved by the use of a brush windrower embodying the present invention. One man operating a tractor having the windrower attached thereto can accumulate, in a very short time, the brush which it would take hand gatherers many hours to accumulate. A second operator with a fork lift or front end loader on a tractor can quickly load the accumulated piles into a truck or wagon for removal from the orchard. Thus, in two mechanized and rapid operations, large amounts of brush can be removed conveniently, quickly and thoroughly. Workers are not required to work under the low overhanging branches of the fruit trees or nut trees, or in among the brush and trimmings. Further, since one operator can accumulate the brush into large piles and one operator can then load the piles, it is not usually necessary to hire additional labor for the brush collecting operation. Since the brush can be removed from the orchard quickly, the brush is prevented from becoming matted down or being blown about the orchard.

Although one embodiment and one modification have been described in detail herein, various other changes may be made without departing from the scope of the present invention.

I claim:

1. A brush windrower to be towed behind a tractor to accumulate branches lying on the ground beneath orchard and nut trees, comprising a main frame extending rearwardly from the tractor, a means for connecting said main frame to the tractor, a rake bar connected to said main frame and extending outwardly therefrom to pass underneath the overhanging limbs from the trees, a plurality of rake teeth extending downwardly from said rake bar to accumulate the branches as said windrower is towed forward, and a means for removing said rake teeth from the accumulated pile of branches during the discharge phase of operation.

2. A brush windrower as defined in claim 1 in which said means for removing said rake teeth from the accumulated branches includes a member having a shaft pivotally mounted in said main frame, said member extending downwardly from said main frame and being connected to said rake bar, a means for moving said rake bar relative to said main frame by rotating said shaft in said main frame, and a means for tilting said rake teeth to dislodge said rake teeth from the accumulated branches.

3. A brush windrower as defined in claim 2 in which said means for moving said rake bar relative to said main frame is a hydraulic cylinder connected to said main frame and said member.

4. A brush windrower as defined in claim 2 in which said means for tilting said rake teeth includes a cylindrical portion in said member and a shaft member rotatably mounted in said cylindrical portion and connected to said rake bar to permit force exerted on the back of said rake teeth to pivot said shaft member in said cylindrical portion.

5. A brush windrower as defined in claim 4 in which said means for moving said rake bar relative to said main frame is a hydraulic cylinder connected to said main frame and said member.

6. A brush windrower as defined in claim 4 in which a first plate is positioned above said rake bar and is affixed to said shaft member, a second plate is positioned below said rake bar, and a plurality of bolts extend between said first and second plates to clamp said rake bar between said plates.

7. A brush windrower as defined in claim 5 in which a first plate is positioned above said rake bar and is affixed to said shaft member, a second plate is positioned below said rake bar, and a plurality of bolts extend between said first and second plates to clamp said rake bar between said plates.

8. A brush windrower as defined in claim 1 in which said means for connecting said main frame to said tractor includes a three point hitch mechanism.

9. A brush windrower as defined in claim 1 in which a member is connected to said main frame and said means for connecting said main frame to said tractor and forms a vertical axis about which said main frame can pivot, and a hydraulic cylinder is operatively connected to said main frame and said connecting means to pivot said main frame around said vertical axis.

10. A brush windrower as defined in claim 7 in which said means for connecting said main frame to said tractor includes a three point hitch mechanism, and a member is connected to said main frame and said three point hitch mechanism to form a vertical axis around which said main frame can pivot, and a hydraulic cylinder is operatively connected to said main frame and said three point hitch mechanism to pivot said main frame around said vertical axis.

11. A brush windrower as defined in claim 9 in which said member connected to said main frame and said means for connecting said main frame to said tractor includes a structure forming a horizontal axis on which said member pivots.

12. A brush windrower as defined in claim 10 in which said member connected to said main frame and said three point hitch mechanism includes a structure forming a horizontal axis on which said member pivots.

13. A brush windrower as defined in claim 12 in which said rake bar includes a plurality of sections having rake teeth thereon and said sections are connected together to form various lengths of rake bars.

14. A brush windrower to be towed behind a tractor comprising a main frame extending rearwardly from and pivotally connected at its forward end on a first vertical axis to the tractor, a rake bar pivotally connected on a second vertical axis to the rear end of said main frame, a plurality of rake teeth extending downwardly from said rake bar to accumulate branches as said windrower is towed forward, a first power means for pivoting said main frame on said first verticl axis, and a second power means for pivoting said rake bar on said second vertical axis between a position extending laterally from said main frame and a position substantially parallel with said main frame.

15. A brush windrower as defined in claim 14 in which a means is included for pivoting said rake bar on its horizontal axis.

16. A brush windrower as defined in claim 15 in which said first power means and said second power means are hydraulic cylinders.

* * * * *